(12) United States Patent
Kuromizu

(10) Patent No.: US 10,393,952 B2
(45) Date of Patent: Aug. 27, 2019

(54) OPTICAL UNIT AND DISPLAY APPARATUS

(71) Applicant: Sakai Display Products Corporation, Sakai-shi, Osaka (JP)

(72) Inventor: Yasumori Kuromizu, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 734 days.

(21) Appl. No.: 14/907,394

(22) PCT Filed: Jul. 26, 2013

(86) PCT No.: PCT/JP2013/070375
§ 371 (c)(1),
(2) Date: Mar. 15, 2016

(87) PCT Pub. No.: WO2015/011834
PCT Pub. Date: Jan. 29, 2015

(65) Prior Publication Data
US 2016/0187572 A1    Jun. 30, 2016

(51) Int. Cl.
*F21V 8/00*    (2006.01)

(52) U.S. Cl.
CPC ......... *G02B 6/0088* (2013.01); *G02B 6/0033* (2013.01); *G02B 6/0055* (2013.01); *G02B 6/0093* (2013.01)

(58) Field of Classification Search
CPC .. G02B 6/0033; G02B 6/0055; G02B 6/0088; G02B 6/0093
See application file for complete search history.

(56) References Cited

U.S. PATENT DOCUMENTS

| | | | |
|---|---|---|---|
| 6,402,335 B1* | 6/2002 | Kalantar | G02B 6/0036 362/223 |
| 2003/0223020 A1 | 12/2003 | Lee | |
| 2006/0007708 A1* | 1/2006 | Lee | G02B 6/0088 362/632 |
| 2006/0268194 A1 | 11/2006 | Morimoto et al. | |
| 2010/0165234 A1* | 7/2010 | Park | G02B 6/0088 349/58 |
| 2018/0246270 A1* | 8/2018 | Di Trapani | F21S 8/04 |

FOREIGN PATENT DOCUMENTS

| | | |
|---|---|---|
| JP | 2002-311430 A | 10/2002 |
| JP | 2006-330536 A | 12/2006 |
| JP | 2009-049017 A | 3/2009 |
| JP | 2010-204390 A | 9/2010 |
| WO | WO2012036061 A1 | 3/2012 |
| WO | WO2012073826 A1 | 6/2012 |

* cited by examiner

*Primary Examiner* — Robert J May
*Assistant Examiner* — Leah Simone Macchiarolo
(74) *Attorney, Agent, or Firm* — Rudy J. Ng; Bret E. Field; Bozicevic, Field & Francis LLP

(57) ABSTRACT

Provided is an optical unit which includes a light guide plate configured to emit light made incident thereon through a light incident side surface from one surface thereof, and a reflection sheet disposed to face the light guide plate, wherein the reflection sheet has a projection piece which protrudes with respect to a surface of the reflection sheet on one edge thereof. The projection piece is held with being in surface contact with any one side surface of the light guide plate, thereby the reflection sheet is held so as to face the light guide plate.

17 Claims, 14 Drawing Sheets

F I G. 1
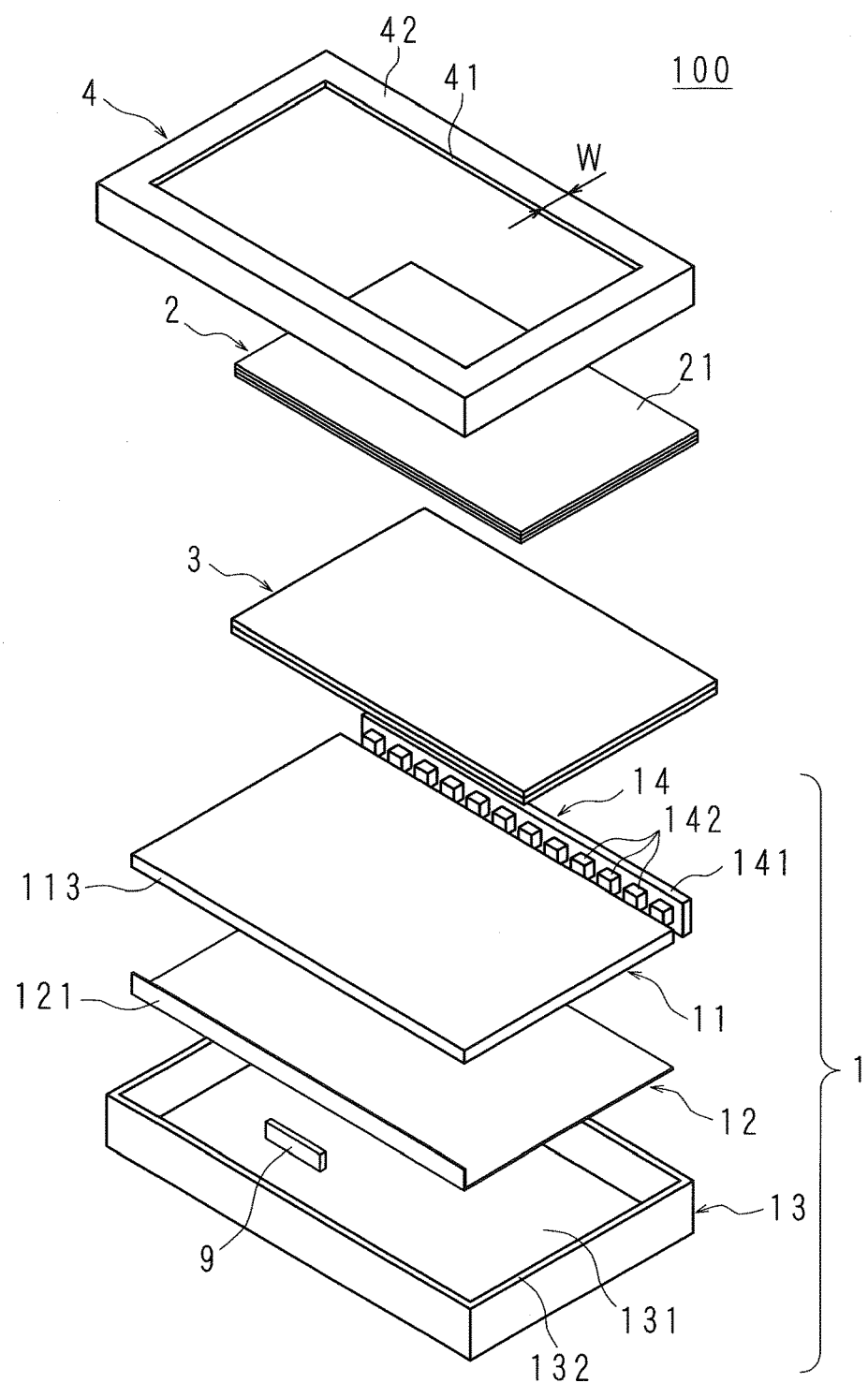

OPTICAL UNIT AND DISPLAY APPARATUS

This application is the national phase under 35 U.S.C. § 371 of PCT International Application No. PCT/JP2013/070375 which has an International filing date of Jul. 26, 2013 and designated the United States of America.

BACKGROUND

1. Technical Field

The present invention relates to an optical unit which includes a light guide plate for emitting light made incident on a side surface from one surface thereof, and a reflection sheet disposed opposite to the light guide plate, and a display apparatus including the optical unit.

2. Description of Related Art

Recently, a display apparatus such as a liquid crystal television has been widely distributed. Such a display apparatus includes a light guide plate and a reflection sheet disposed opposite to the light guide plate.

For example, Japanese Patent Laid-open Publication No. 2002-311430 discloses a liquid crystal display apparatus including a diffusion sheet, a lens sheet, and a diffusion sheet which are disposed on a side opposite to a light emitting surface of a light guide plate to face the light guide plate, protrusion parts formed on edges of the sheets, a reflection sheet disposed on a side surface of the light guide plate so as to protrude from the side surface, and opening parts provided in portions of the reflection sheet protruding therefrom, wherein the protrusion parts of the diffusion sheet, the lens sheet, and the diffusion sheet are locked into the opening parts.

SUMMARY

Meanwhile, among the display apparatuses, the display apparatus having a structure for suspending the light guide plate or the reflection sheet requires a hanging mechanism (for example, a pin member or the like) for suspending.

Therefore, in the display apparatus having such a structure, the hanging mechanism is to be an obstacle, such that it is difficult to provide the light guide plate by extending the same to a position of the hanging mechanism.

In addition, when an image display region extends so that a position relating to the hanging mechanism is included in the image display region in an image display screen, while the light guide plate does not extend to the position of the hanging mechanism, a problem (luminance unevenness) occurs at a portion corresponding to the hanging mechanism in the image display region due to the presence of the hanging mechanism, and thereby provides an abnormal feeling to a user.

However, the liquid crystal display apparatus of Japanese Patent Laid-open Publication No. 2002-311430 does not have the structure for suspending the light guide plate or the reflection sheet, and ingenuity regarding the above-described problem has not been conducted, such that it is not possible to cope therewith.

In consideration of the above-mentioned circumstances, it is an object of the present invention to provide an optical unit which includes a light guide plate configured to emit light made incident thereon through a light incident side surface from one surface thereof, and a reflection sheet disposed opposite to the light guide plate, wherein the reflection sheet has a projection piece protruding on one edge thereof perpendicular to a surface of the reflection sheet, and the projection piece is held by any one side surface of the light guide plate with being in surface contact therewith, such that it is possible to solve the above-described problem that the light guide plate may not be provided by extending the same due to the hanging mechanism being disturbed, and extend the image display region, as well as the complex hanging mechanism as described above is unnecessary, such that luminance unevenness does not occur at a portion of the image display region corresponding to the hanging mechanism, and a display apparatus including the same.

According to one aspect of the present invention, there is provided an optical unit which includes a light guide plate configured to emit light made incident thereon through a light incident side surface from one surface thereof, and a reflection sheet disposed opposite to the light guide plate, wherein the reflection sheet has a projection piece on one edge thereof, which protrudes with respect to a surface of the reflection sheet and the projection piece is held with being in surface contact with any one side surface of the light guide plate.

In the present invention, the projection piece protrudes perpendicular to the surface of the reflection sheet at the one edge of the reflection sheet, and the projection piece is held with being in surface contact with any one side surface of the light guide plate, such that the reflection sheet is held so as to face the light guide plate.

According to the present invention, since the problem that the light guide plate may not be provided by extending the same due to the hanging mechanism being an obstacle may be solved, it is possible to extend the image display region. In addition, since the complex hanging mechanism is unnecessary, luminance unevenness does not occur at a portion of the image display region corresponding to the hanging mechanism.

The above and further objects and features will move fully be apparent from the following detailed description with accompanying drawings.

BRIEF DESCRIPTION OF THE SEVERAL VIEWS OF THE DRAWINGS

FIG. 1 is an exploded perspective view illustrating a configuration of main components of a liquid crystal television according to Embodiment 1 of the present invention.

DETAILED DESCRIPTION

Hereinafter, a case in which an optical unit and a display apparatus according to embodiments of the present invention are applied to a so-called liquid crystal television including a liquid crystal display panel will be described in detail as an example, with reference to the accompanying drawings.

Embodiment 1

Figure 2:
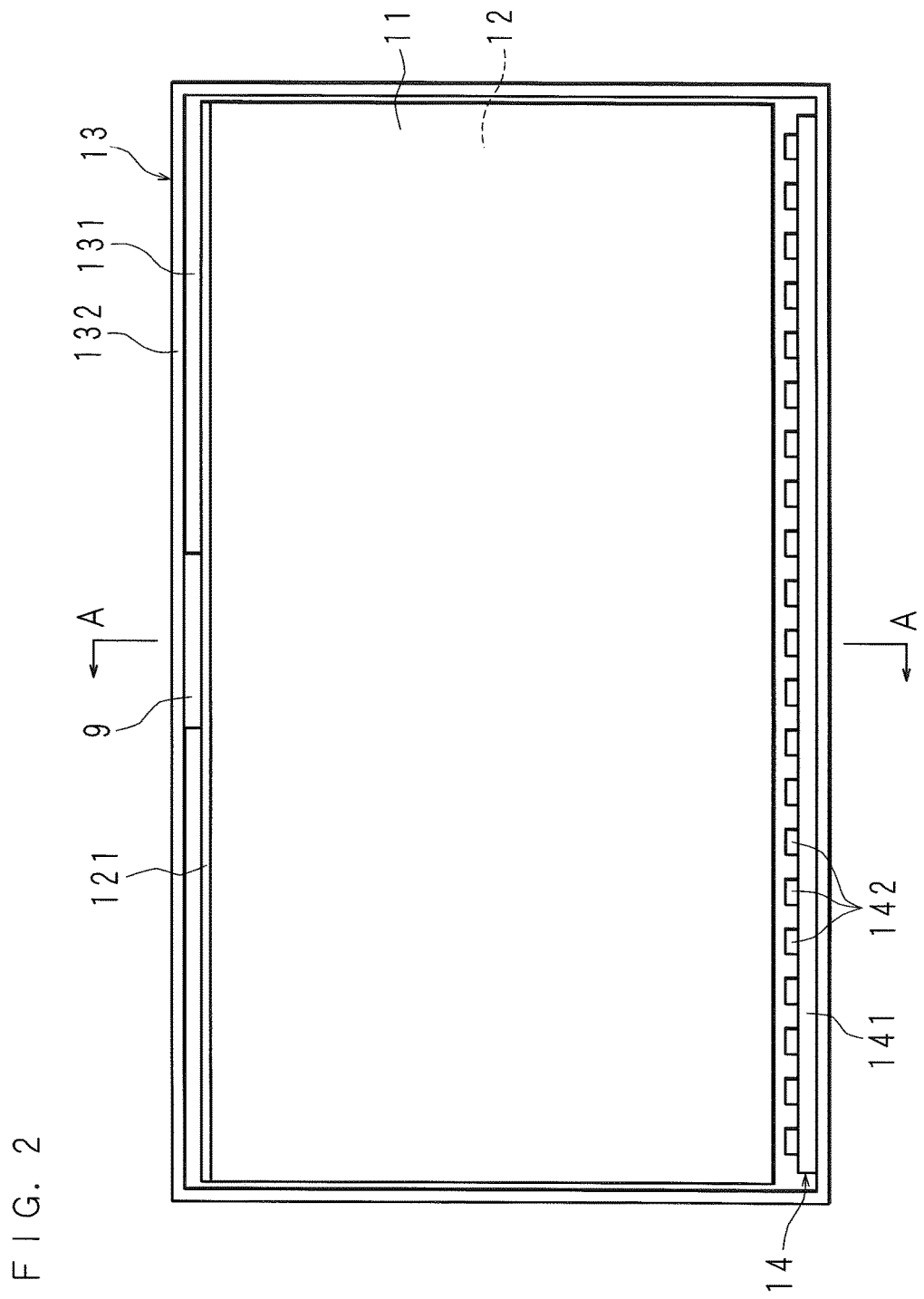
FIG. 2 is a view schematically illustrating a state in which a light guide plate and a reflection sheet are stored in the liquid crystal television according to Embodiment 1 of the present invention.
Figure 3:
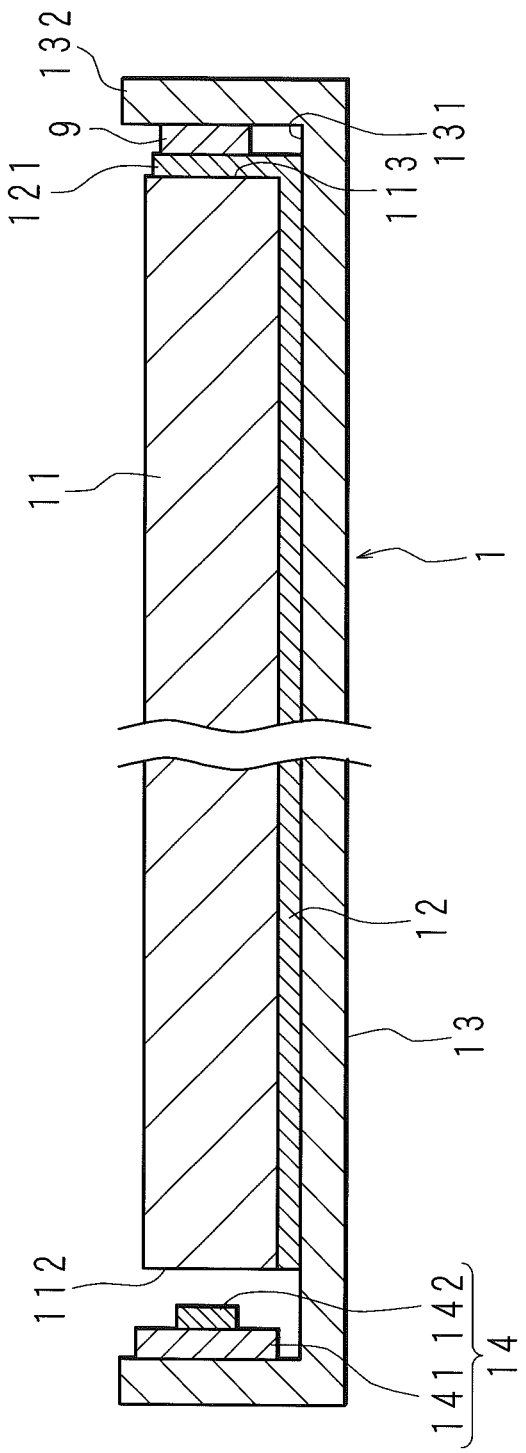
FIG. 3 is a longitudinal-sectional view taken on line A-A in FIG. 2.

FIG. 1 is an exploded perspective view illustrating a configuration of main components of a liquid crystal television according to Embodiment 1 of the present invention, FIG. 2 is a view schematically illustrating a state in which a light guide plate and a reflection sheet are stored in the liquid crystal television according to Embodiment 1 of the present invention, and FIG. 3 is a longitudinal-sectional view taken along line A-A in FIG. 2. In the drawings, a liquid crystal television 100 according to the embodiments of the present invention is illustrated.

The liquid crystal television 100 includes a light source device 1, a liquid crystal display panel 2, an optical sheet 3 and a front chassis 4 in which the liquid crystal display panel 2 and the optical sheet 3 are stored and the like.

Further, the light source device 1 includes a light source unit 14, a light guide plate 11 which guides light made incident thereon from the light source unit 14 to one surface thereof on the liquid crystal display panel 2 side, a reflection sheet 12 which reflects the light made incident on the light guide plate 11 from the light source unit 14 toward the one surface of the light guide plate 11, and a backlight chassis 13 in which the light source unit 14, the light guide plate 11 and the reflection sheet 12 are stored.

The optical unit in the claims includes the light guide plate 11, the reflection sheet 12 and the backlight chassis 13.

The front chassis 4 is disposed on a front side from the liquid crystal display panel 2 on which an image is displayed. The front chassis 4 is formed in a cylindrical shape having a rectangular bottom copying the shape of one surface 21 of the liquid crystal display panel 2 viewed from a user, and has a rectangular display window 41 opened in the bottom thereof. The user may view the image displayed on the one surface 21 of the liquid crystal display panel 2 through the display window 41.

Portions between edges of the bottom of the front chassis 4 and edges of the display window 41 have a prescribed width W. In other words, in the bottom of the front chassis 4, residual portions other than the display window 41 are formed as a hollow rectangular frame part 42. Hereinafter, for the convenience of explanation, a long-side direction and a short-side direction of the front chassis 4 (liquid crystal television 100) are referred to as a lateral direction and a longitudinal direction, respectively.

Peripheral edge parts of the one surface 21 of the liquid crystal display panel 2 are covered with the frame part 42, and the optical sheet 3 is provided on the other surface side of the liquid crystal display panel 2, so that one surface of the optical sheet 3 is disposed opposite to the other surface of the liquid crystal display panel 2.

The liquid crystal display panel 2 is an active matrix type, for example, and includes a transparent substrate on the one surface 21 side and a transparent substrate on the other surface side, which are disposed to face each other at a prescribed gap. Liquid crystal is sealed in the gap between these transparent substrates. A polarizing plate (not illustrated) is provided between the transparent substrate on the other surface side and the optical sheet 3.

The light guide plate 11 of the light source device 1 is provided on the other surface side of the optical sheet 3, and the one surface of the light guide plate 11 is disposed opposite to the other surface of the optical sheet 3.

The optical sheet 3 is a publicly known sheet which functions to diffuse and collect, etc. light emitted from the light source unit 14 and made incident thereon through the light guide plate 11, so as to more uniformly emit the light toward the liquid crystal display panel 2. For example, the optical sheet 3 includes two diffusion sheets, and one prism sheet, wherein the prism sheet is installed between the two diffusion sheets.

One diffusion sheet of the two diffusion sheets, which is disposed on the light guide plate 11 side, is an optical sheet which functions to diffuse the light made incident thereon from the light source unit 14 through the light guide plate 11 and allow it to be made incident on the prism sheet. In addition, the prism sheet is an optical sheet which functions to collect the light made incident thereon through the one diffusion sheet and emit it toward the other diffusion sheet. The light passing through the prism sheet is made incident on the other diffusion sheet perpendicular to the prism sheet.

The other diffusion sheet disposed on the liquid crystal display panel 2 side is an optical sheet which functions to again diffuse the light made incident thereon through the prism sheet and emit it toward the liquid crystal display panel 2 with a more uniform luminance distribution.

The light source device 1 is a so-called edge light type, and includes the light source unit 14, the light guide plate 11 disposed on the other surface side of the optical sheet 3, and the reflection sheet 12 provided on the other surface side light guide plate 11. The reflection sheet 12 is disposed so that one surface thereof faces the other surface of the light guide plate 11, and the light guide plate 11 and the reflection sheet 12 and stored in the backlight chassis 13 with being stacked.

The light guide plate 11 is made of a high transparency rectangular acrylic resin, for example, has a prescribed thickness, and guides the light emitted by light source unit 14 near one side surface thereof to the optical sheet 3 (liquid crystal display panel 2). For example, the light guide plate 11 may be configured in such a manner that one surface thereof facing the other surface of the optical sheet 3 has a light emitting surface on which a pattern is formed so that the light made incident thereon from the light source unit 14 advances in the liquid crystal display panel 2 direction. Thereby, the light guide plate 11 may convert the light made incident thereon from the light source unit 14 into flat light to uniformly transmit it to the optical sheet 3 through the light emitting surface. Further, the reflection sheet 12 is provided on the other surface side of the light guide plate 11. Hereinafter, the one side surface of the light guide plate linear to the light source unit 14 is referred to as a proximal side surface 112 (light incident side surface), and the other side surface which faces the proximal side surface 112 on a side far from the light source unit 14 is referred to as a distal side surface 113.

Meanwhile, the reflection sheet 12 is formed in a rectangular shape having substantially the same dimensions as the light guide plate 11 or slightly larger than the light guide plate 11, and irregularly reflects the light made incident on the light guide plate 11 from the light source unit 14 at the other surface side of the light guide plate 11 to emit it through the light emitting surface of the light guide plate 11.

The reflection sheet 12 has a projection piece 121 at one long-side edge on the distal side surface 113 side of the light guide plate 11. The projection piece 121 has, for example, a strip shape, and protrudes perpendicular to the one surface of the reflection sheet 12. In detail, the projection piece 121 has a longitudinal dimension the same as the dimension of the one long-side edge of the reflection sheet 12, and a lateral dimension substantially the same as a thickness of the light guide plate 11.

The projection piece 121 is supported by a clamping part 9 to be described below and the distal side surface 113 with an inner surface thereof being in surface contact with the distal side surface 113 of the light guide plate 11. Thereby, the reflection sheet 12 is suspended so that the one surface thereof faces the other surface of the light guide plate 11.

The projection piece 121 may be easily formed, for example, by preparing a sheet having a size that the size of the projection piece 121 is superfluously added to the size of the reflection sheet 12, and including perforations for bending at a position to be the one long-side edge of the reflection sheet 12.

The backlight chassis 13 is a housing in which the light guide plate 11 and the reflection sheet 12 are stored. The backlight chassis 13 has a rectangular bottom 131 copying the shape of the light guide plate 11 and the reflection sheet 12, and side walls 132 which stand vertical to the bottom 131 and are connected to the edges of the bottom 131.

The clamping part 9 is provided in the vicinity of the one long-side edge of the reflection sheet 12 and inside of the side walls 132 of the backlight chassis 13. As described above, the clamping part 9 is in surface contact with an outside of the projection piece 121 and press the projection piece 121 to the distal side surface 113 of the light guide plate 11. Therefore clamping part 9 clamps the projection piece 121 together with the distal side surface 113. For example, the clamping part 9 is integrally formed with the backlight chassis 13.

When the clamping part 9 holds the projection piece 121 between the distal side surface 113 of the light guide plate 11 as described above, the projection piece 121 is configured to slide.

For example, by performing a prescribed processing on a contact surface with the projection piece 121 of the clamping part 9, the clamping part 9 and the projection piece 121 are configured so as to be in point contact or line contact, when they come into contact with each other. Thereby, a contact area between the clamping part 9 and the projection piece 121 is decreased, such that the projection piece 121 may slide when the reflection sheet 12 is thermally expanded or contracted.

The clamping part 9 is a rectangular parallelepiped made of, for example, a high-density micro-cell urethane foam, rubber or elastomer. In addition, the present invention is not limited thereto, and the clamping part 9 may be resin rubber, a metal spacer, a screw or the like. Further, in a thickness direction of the light guide plate 11, one surface of the clamping part 9 which comes in contact with the outer surface of the projection piece 121 has substantially the same dimensions as the outer surface of the projection piece 121.

In addition, the present invention is not limited to the above description, and by manufacturing the clamping part 9 using a material having good thermal conductivity, the clamping part 9 may be configured to absorb a heat of the light guide plate 11 through the projection piece 121, and dissipate it to the backlight chassis 13.

The light source unit 14 is provided on a lower side surface of both long-sides of the light guide plate 11, that is, in the vicinity of the proximal side surface 112. The light source unit 14 has a substrate 141 disposed opposite to the proximal side surface 112 of the light guide plate 11, a plurality of light sources 142, 142, . . . , and 142 which are mounted on the substrate 141 and juxtaposed along the proximal side surface 112 of the light guide plate 11. The light sources 142, 142, . . . , and 142 may be, for example, a light emitting diode (LED), cold cathode fluorescent lamp (CCFL), hot cathode fluorescent lamp (HCFL), external electrode fluorescent lamp (EEFL) or the like.

In the present invention, the light source unit 14 is not limited to the above-described configuration. For example, it may be configured such that the light source unit 14 is provided at both side surface sides of both short-sides of the light guide plate 11 or any one side surface thereof, and may be configured to be provided on both side surface sides of both short-sides of the light guide plate 11 and the proximal side surface 112.

Due to having the above-described configuration, in the liquid crystal television 100 according to Embodiment 1 of the present invention, it is possible to narrow the width W of the frame part 42 by extending the display window 41, and extend an area of the image display region in the liquid crystal display panel 2 (one surface 21), which will be described in detail below with reference to FIG. 2.

In the display apparatus having the structure for suspending the light guide plate 11 or the reflection sheet 12, as the liquid crystal television 100 of the present invention, a hanging mechanism for the suspending is required.

For example, when such a hanging mechanism has a configuration in which an upper edge part of the reflection sheet is penetrated by a pin member provided on the bottom of the backlight chassis, so as to suspend the reflection sheet, the pin member is disturbed, such that it is difficult to provide the light guide plate by extending the same, and as a result, it is necessary to increase the width W of the frame part 42.

However, in the liquid crystal television 100 according to Embodiment 1 of the present invention, as described above, the projection piece 121 is held by the clamping part 9 and the distal side surface 113 with being in surface contact with the distal side surface 113 of the light guide plate 11. Thereby, the reflection sheet 12 is suspended so as to face the light guide plate 11.

That is, the hanging mechanism of the liquid crystal television 100 according to Embodiment 1 of the present invention has a simple structure, as described above, and does not have such a configuration which is complex and hinders the extension of the light guide plate 11. Accordingly, in the liquid crystal television 100 according to Embodiment 1 of the present invention, it is possible to extend the light guide plate 11, so as to correspond to an entire region of the reflection sheet 12 or the bottom 131 of the backlight chassis 13. Thereby, in the liquid crystal television 100 according to the present invention, it is possible to narrow the width W of the frame part 42, and provide a wider image display region to the user.

Further, in the liquid crystal television 100 according to Embodiment 1 of the present invention, the projection piece 121 which is held by the clamping part 9 and the distal side surface 113 is provided only at the one long-side edge of the reflection sheet 12. That is, the other long-side edge opposite to the one long-side edge of the reflection sheet 12 is configured to be freely extended or contracted without being restrained by other members. Thus, the reflection sheet 12 may be extended or contracted according to an increase or a decrease in a temperature during using the liquid crystal television 100, and an occurrence of a deflection in the reflection sheet 12 may be prevented.

The present invention is not limited to the above description, and may be configured, for example, so that the reflection sheet 12 is held between the other side of the light guide plate 11 and the bottom 131 of the backlight chassis 13.

In the above description, the case in which the light source unit 14 is provided near the side surface on the lower long-side of the light guide plate 11 has been described as an example, but the present invention is not limited thereto. For example, it may be configured such that the light source unit 14 is provided at any one place on both sides of short-sides of the light guide plate 11 or both two places thereof. In addition, it may be configured such that the light source units 14 are provided at three places including two places on both sides of short-sides of the light guide plate 11 and one place on the side of the lower long-side of the light guide plate 11 by adding thereto.

Embodiment 2

In Embodiment 1, the case in which the projection piece 121 has a strip shape and protrudes perpendicular to the one surface of the reflection sheet 12, and the projection piece 121 has a longitudinal dimension substantially the same as the dimension of the one long-side edge of the reflection sheet 12 and a lateral dimension substantially the same as the thickness of the light guide plate 11 has been described as an example, but the present invention is not limited thereto.

Figure 4:
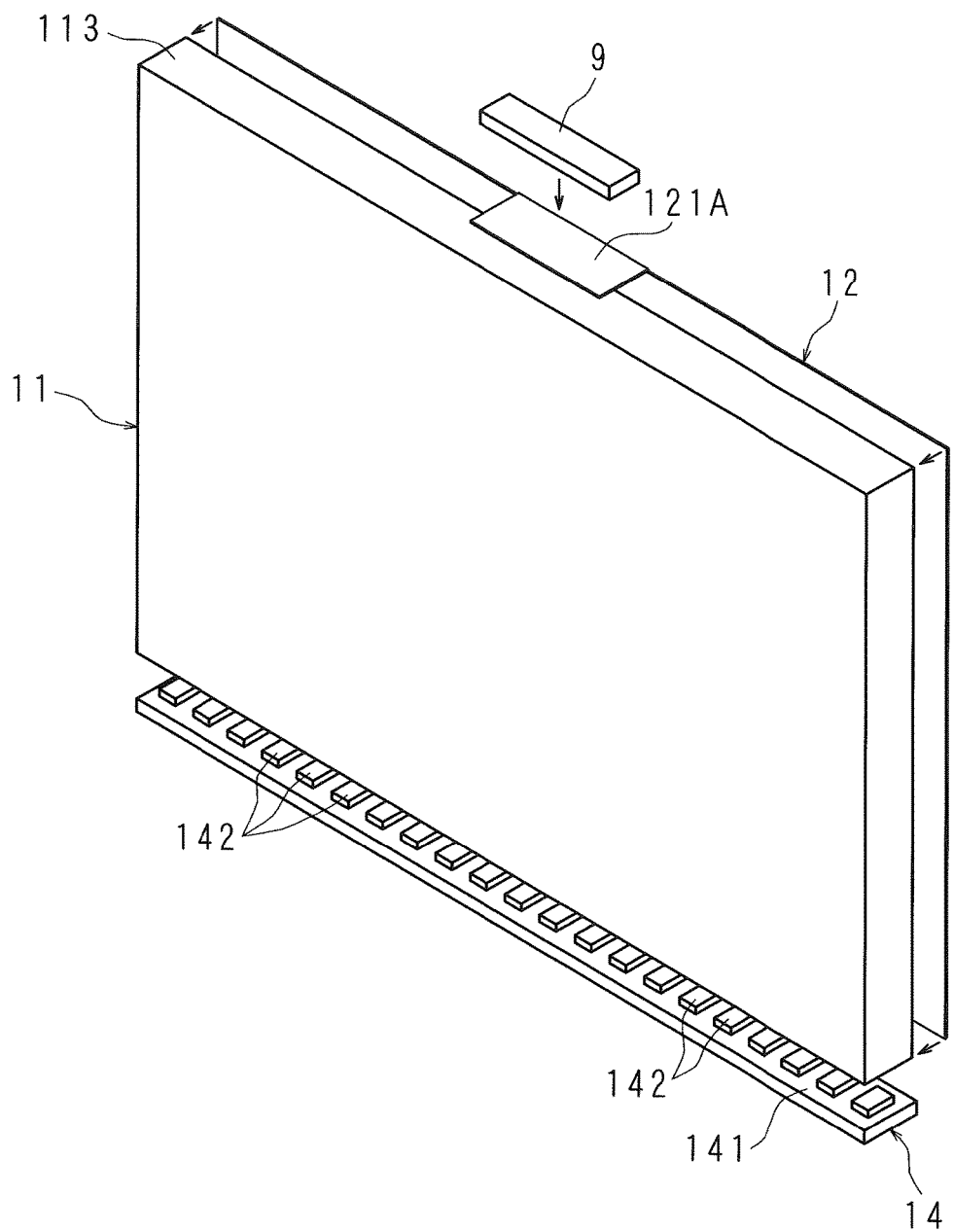
FIG. 4 is a view describing a relation between a light guide plate, a reflection sheet and a light source, in a liquid crystal television according to Embodiment 2 of the present invention.
Figure 5:
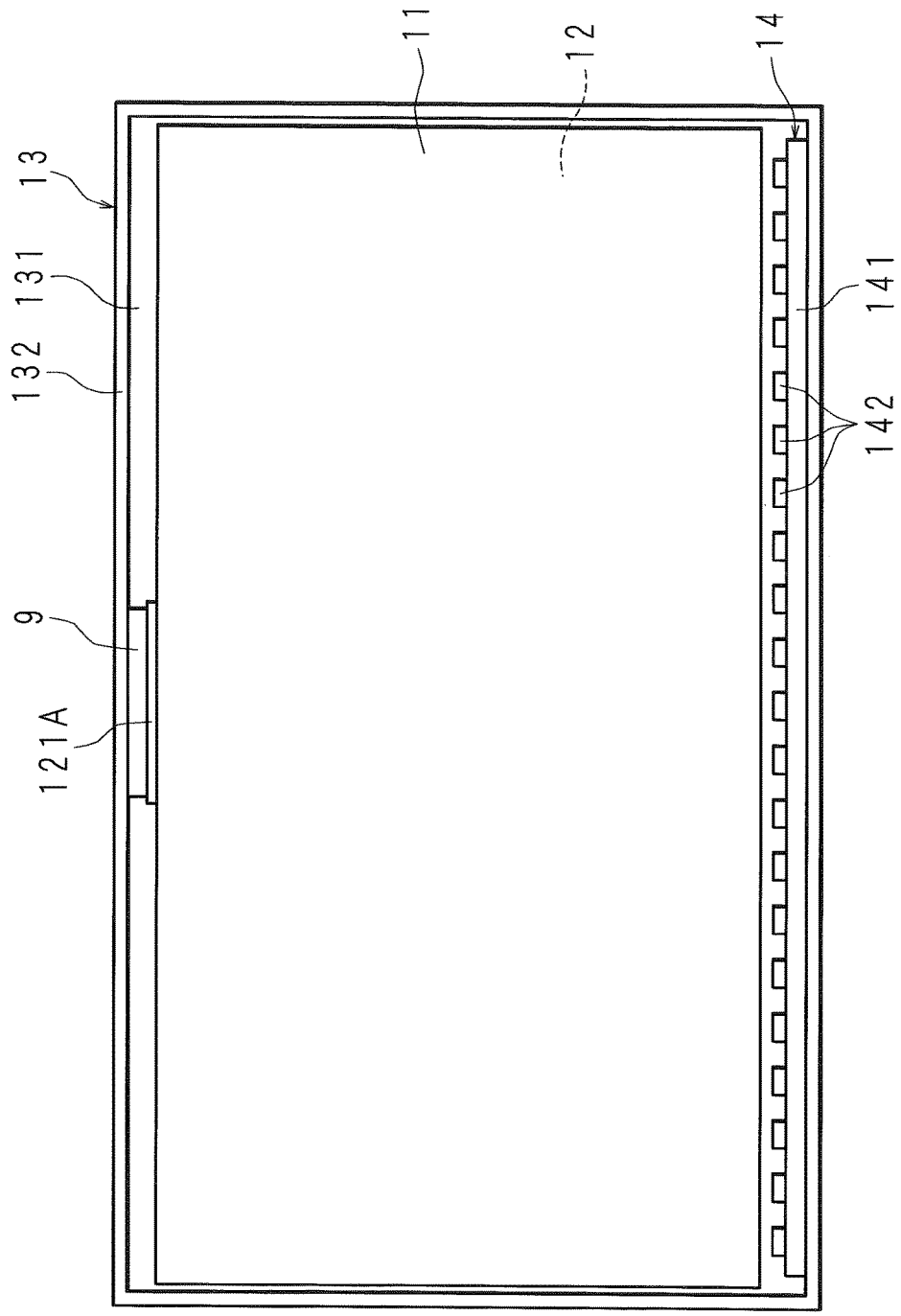
FIG. 5 is a view schematically illustrating a state in which the light guide plate and the reflection sheet are stored in the liquid crystal television according to Embodiment 2 of the present invention.

FIG. 4 is a view describing a relation between the light guide plate 11, the reflection sheet 12 and the light source unit 14, in a liquid crystal television 100 according to Embodiment 2 of the present invention, and FIG. 5 is a view schematically illustrating a state in which the light guide plate 11 and the reflection sheet 12 are stored in the liquid crystal television 100 according to Embodiment 2 of the present invention.

In the liquid crystal television 100 according to Embodiment 2 of the present invention, a projection piece 121A is provided at one long-side edge of the reflection sheet 12 near the distal side surface 113 of the light guide plate 11. In Embodiment 2, the projection piece 121A is formed at a part of the one long-side edge of the reflection sheet 12.

That is, the projection piece 121A has a rectangular shape, and protrudes perpendicular to the one surface of the reflection sheet 12. In addition, the projection piece 121A has a lateral dimension substantially the same as the thickness of the light guide plate 11, and the projection piece 121A has a longitudinal dimension substantially the same as a length of the clamping part 9, for example.

Further, the projection piece 121A is provided at a central part of the one long-side edge of the reflection sheet 12. In addition, in order to prepare the extension and contraction of the reflection sheet 12 according to an increase or a decrease in a temperature during using the liquid crystal television 100, the clamping part 9 is configured to be located at the central part of the projection piece 121A in the long-side direction thereof.

Due to having the above-described configuration, in the liquid crystal television 100 according to Embodiment 2 of the present invention, the projection piece 121A is held between the clamping part 9 and the distal side surface 113 with being in surface contact with the distal side surface 113 of the light guide plate 11. Thereby, the reflection sheet 12 is suspended so that the one surface thereof faces the other surface of the light guide plate 11.

Therefore, in the liquid crystal television 100 according to Embodiment 2 of the present invention, it is possible to simply suspend the reflection sheet 12 without being disturbed by the extension of the light guide plate 11, and extend the light guide plate 11, so as to correspond to the entire region of the reflection sheet 12 or the bottom 131 of the backlight chassis 13. Thereby, in the liquid crystal television 100 according to the present invention, it is possible to narrow the width W of the frame part 42, and provide a wider image display region to the user.

Further, since the projection piece 121A is formed at a part of the one long-side edge of the reflection sheet 12, wasteful use or dissipation of resources may be prevented.

In the above description, the case in which the projection piece 121A is provided at one place of the central part of the one long-side edge of the reflection sheet 12 has been described as an example, but the present invention is not limited thereto. For example, the projection piece 121A may be provided at any position other than the central part of the one long-side edge of the reflection sheet 12, and may be configured to be provided at a plurality of places of the one long-side edge of the reflection sheet 12.

The same parts as those in Embodiment 1 will be denoted by the same reference numerals, and will not be described in detail.

In the above description, the case in which the light source unit 14 is provided near the side surface on the lower long-side of the light guide plate 11 has been described as an example, but the present invention is not limited thereto. For example, it may be configured such that the light source unit 14 is provided at any one place on both sides of short-sides of the light guide plate 11 or both two places thereof. In addition, it may be configured such that the light source units 14 are provided at three places including two places on both sides of short-sides of the light guide plate 11 and one place on the side of the lower long-side of the light guide plate 11 by adding thereto.

Embodiment 3

In Embodiment 1, the case in which the projection piece 121 has a strip shape and protrudes perpendicular to the one surface of the reflection sheet 12, and the projection piece 121 has a longitudinal dimension substantially the same as the dimension of the one long-side edge of the reflection sheet 12 and a lateral dimension substantially the same as the thickness of the light guide plate 11 has been described as an example, but the present invention is not limited thereto.

Figure 6:
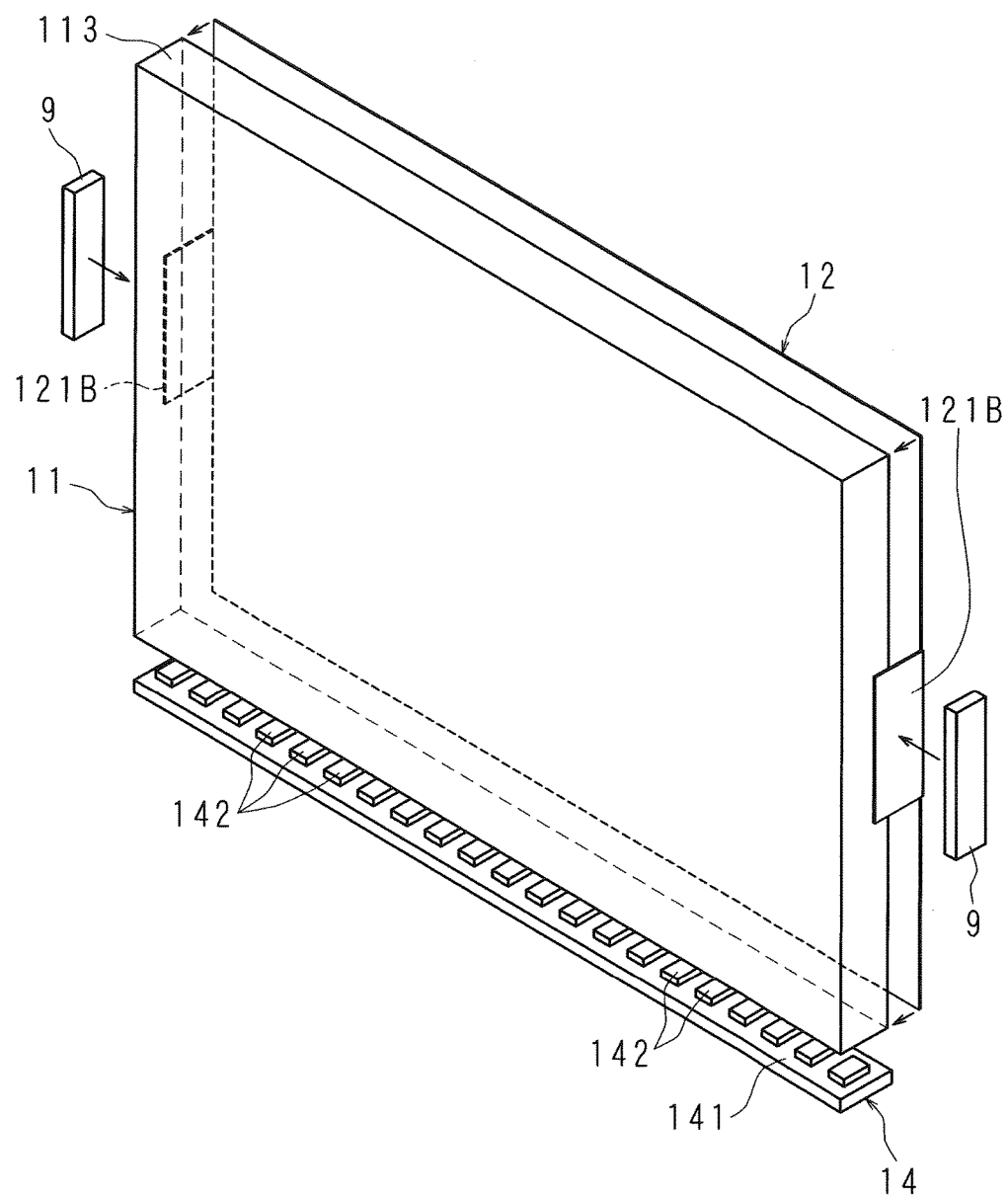
FIG. 6 is a view describing a relation between the light guide plate, the reflection sheet and the light source, in a liquid crystal television according to Embodiment 3 of the present invention.
Figure 7:
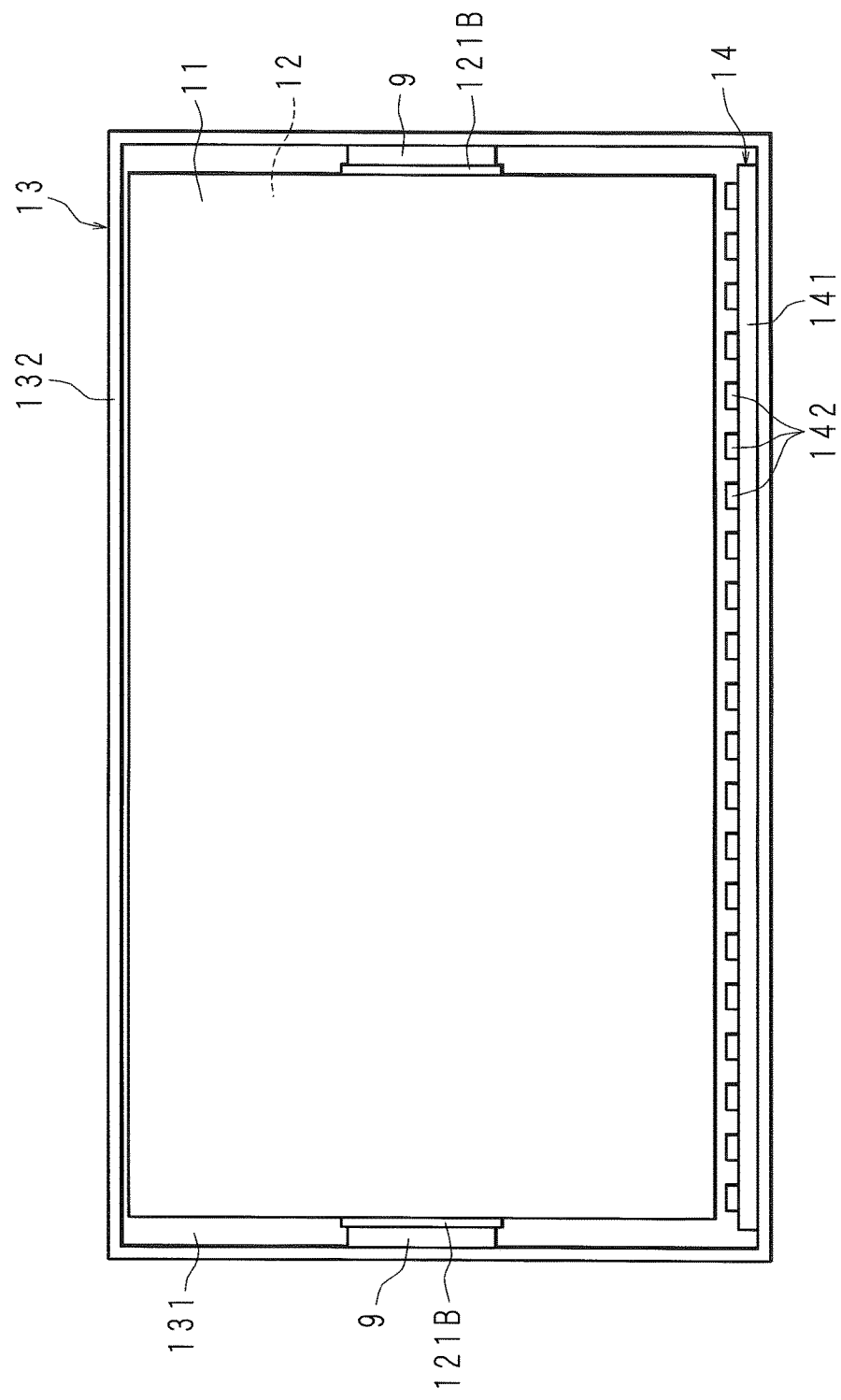
FIG. 7 is a view schematically illustrating a state in which the light guide plate and the reflection sheet are stored in the liquid crystal television according to Embodiment 3 of the present invention.

FIG. 6 is a view describing a relation between the light guide plate 11, the reflection sheet 12 and the light source unit 14, in a liquid crystal television 100 according to Embodiment 3 of the present invention, and FIG. 7 is a view schematically illustrating a state in which the light guide plate 11 and the reflection sheet 12 are stored in the liquid crystal television 100 according to Embodiment 3 of the present invention.

In the liquid crystal television 100 according to Embodiment 3 of the present invention, projection pieces 121B are provided at edges of the reflection sheet 12 near both side surfaces of the light guide plate 11 adjacent to the proximal side surface 112, respectively. In other words, in Embodiment 3, the projection pieces 121B are respectively provided at both short-side edges, except for the one long-side edge and the other long-side edge of the reflection sheet 12. Further, the projection pieces 121B and 121B are formed at a part of the two short-side edges of the reflection sheet 12. Hereinafter, for the convenience of explanation, the both side surfaces of the light guide plate 11 adjacent to the proximal side surface 112 are referred to as a short-side side surface.

That is, the projection pieces 121B and 121B have a rectangular shape, and protrudes perpendicular to the one surface of the reflection sheet 12. In addition, the projection pieces 121B and 121B have a lateral dimension substantially the same as the thickness of the light guide plate 11, and the projection pieces 121B and 121B have a longitudinal dimension substantially the same as the length of the clamping part 9, for example.

Further, in consideration of supporting the weight of the reflection sheet 12, each projection piece 121B is provided on the upper side from the central part of each short-side edge of the reflection sheet 12, in the longitudinal direction or in a direction in which the proximal side surface 112 and the distal side surface 113 face each other. Thereby, in the present embodiment, the clamping parts 9 are provided at two places of the side walls 132 of the backlight chassis 13, so as to correspond to the projection pieces 121B and 121B.

Due to having the above-described configuration, in the liquid crystal television 100 according to Embodiment 3 of the present invention, the projection pieces 121B are held between each clamping part 9 and the short-side side surface with being in surface contact with each short-side side surface of the light guide plate 11. Thereby, the reflection sheet 12 is suspended so that the one surface thereof faces the other surface of the light guide plate 11.

Therefore, in the liquid crystal television 100 according to Embodiment 3 of the present invention, it is possible to simply suspend the reflection sheet 12 without being disturbed by the extension of the light guide plate 11, and extend the light guide plate 11, so as to correspond to the entire region of the reflection sheet 12 or the bottom 131 of the backlight chassis 13. Thereby, in the liquid crystal television 100 according to the present invention, it is possible to narrow the width W of the frame part 42, and provide a wider image display region to the user.

Further, since the projection pieces 121B and 121B are respectively formed at a part of the each short-side edge of the reflection sheet 12, wasteful use or dissipation of resources may be prevented.

In the above description, the case in which each projection piece 121B is provided at one place of the each short-side edge of the reflection sheet 12 has been described as an example, but the present invention is not limited thereto. For example, it may be configured such that the projection pieces 121B are provided at a plurality of places of the short-side edges of the reflection sheet 12.

The same parts as those in Embodiment 1 will be denoted by the same reference numerals, and will not be described in detail.

In the above description, the case in which the light source unit 14 is provided near the side surface on the lower long-side of the light guide plate 11 has been described as an example, but the present invention is not limited thereto. For example, it may be configured such that the light source unit 14 is provided on the side of an upper long-side of the light guide plate 11, and the light source units 14 are provided at two places on both sides of lower and upper long-sides of the light guide plate 11.

In the above description, the case in which the projection pieces 121B and 121B of the reflection sheet 12 are respectively provided on both sides of short-sides of the light guide plate 11 has been described as an example, but the present invention is not limited thereto. For example, it may be configured such that the projection pieces 121B and 121B are respectively provided on both sides of long-sides of the light guide plate 11.

Further, also in the above-described case, it may be configured such that the light source unit 14 is provided at any one place on both sides of short-sides of the light guide plate 11 or both two places thereof.

Embodiment 4

In Embodiment 1, the case in which the projection piece 121 has a strip shape and protrudes perpendicular to the one surface of the reflection sheet 12, and the projection piece 121 has a longitudinal dimension substantially the same as the dimension of the one long-side edge of the reflection sheet 12 and a lateral dimension substantially the same as the thickness of the light guide plate 11 has been described as an example, but the present invention is not limited thereto.

Figure 8:
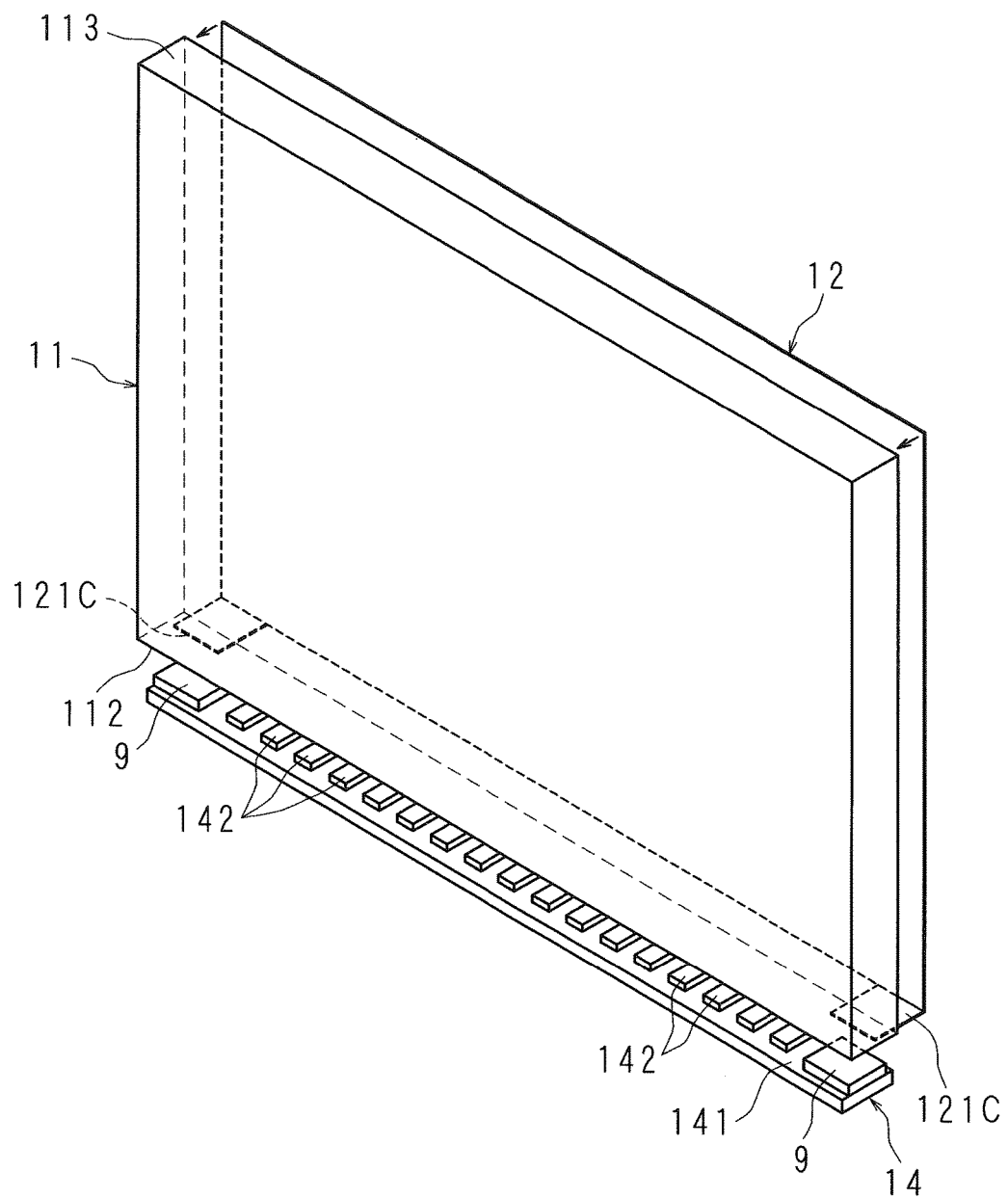
FIG. 8 is a view describing a relation between the light guide plate, the reflection sheet and the light source, in a liquid crystal television according to Embodiment 4 of the present invention.
Figure 9:
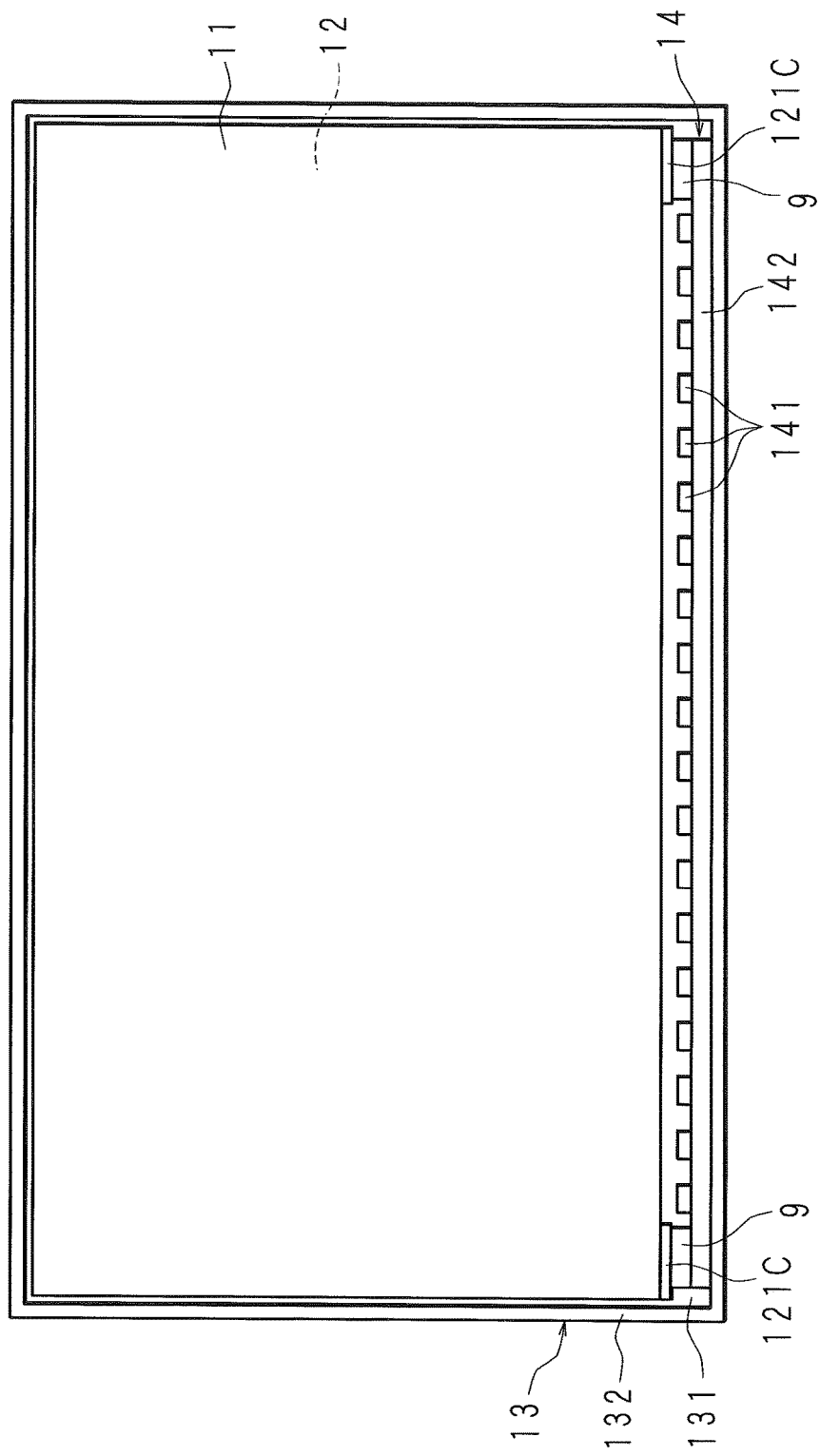
FIG. 9 is a view schematically illustrating a state in which the light guide plate and the reflection sheet are stored in the liquid crystal television according to Embodiment 4 of the present invention.

FIG. 8 is a view describing a relation between the light guide plate 11, the reflection sheet 12 and the light source unit 14, in a liquid crystal television 100 according to Embodiment 4 of the present invention, and FIG. 9 is a view schematically illustrating a state in which the light guide plate 11 and the reflection sheet 12 are stored in the liquid crystal television 100 according to Embodiment 4 of the present invention.

In the liquid crystal television 100 according to Embodiment 4 of the present invention, projection pieces 121C are provided near the proximal side surface 112 of the light guide plate 11, that is, on the other long-side edge of the reflection sheet 12 near the light source unit 14. In Embodiment 4, the projection pieces 121C are formed at a part of the other long-side edge of the reflection sheet 12.

That is, the projection pieces 121C have a rectangular shape, and protrudes perpendicular to the one surface of the reflection sheet 12. In addition, the projection pieces 121C have a lateral dimension substantially the same as the thickness of the light guide plate 11, and the projection pieces 121C have a longitudinal dimension substantially the same as the length of the clamping part 9, for example.

Further, the projection pieces 121C are respectively provided at two places of both end parts of the other long-side edge of the reflection sheet 12. Thereby, in the present embodiment, the clamping parts 9 are provided on both end parts of the substrate 141 in the long-side direction thereof so as to correspond to the projection pieces 121C and 121C, and at portions in which the light source 142 (LED) is not mounted. For example, the clamping parts 9 are integrally molded with the substrate 141.

Due to having the above-described configuration, in the liquid crystal television 100 according to Embodiment 4 of the present invention, the projection pieces 121C are held between the clamping parts 9 and the proximal side surface 112 with being in surface contact with the proximal side surface 112 of the light guide plate 11. Thereby, the reflection sheet 12 is suspended so that the one surface thereof faces the other surface of the light guide plate 11.

Therefore, in the liquid crystal television 100 according to Embodiment 4 of the present invention, it is possible to simply suspend the reflection sheet 12 without being disturbed by the extension of the light guide plate 11, and extend the light guide plate 11, so as to correspond to the entire region of the reflection sheet 12 or the bottom 131 of the backlight chassis 13. Thereby, in the liquid crystal television 100 according to the present invention, it is possible to narrow the width W of the frame part 42, and provide a wider image display region to the user.

In addition, since the projection pieces 121C are formed at a part of the other long-side edge of the reflection sheet 12, wasteful use or dissipation of resources may be prevented.

The same parts as those in Embodiment 1 will be denoted by the same reference numerals, and will not be described in detail.

Embodiment 5

In the liquid crystal television 100 according to Embodiment 2 of the present invention, the case that the projection piece 121A is provided at the one long-side edge of the reflection sheet 12, which is located near the distal side surface 113 of the light guide plate 11, and is formed at the central part of the one long-side edge of the reflection sheet 12 has been described as an example. That is, in Embodiment 2 of the present invention, the projection piece 121A is in surface contact with the central part of the distal side surface 113 of the light guide plate 11 in the longitudinal direction thereof.

However, in Embodiment 5 of the present invention, reflecting sheets are further attached to both sides of the projection piece 121A.

Figure 10:
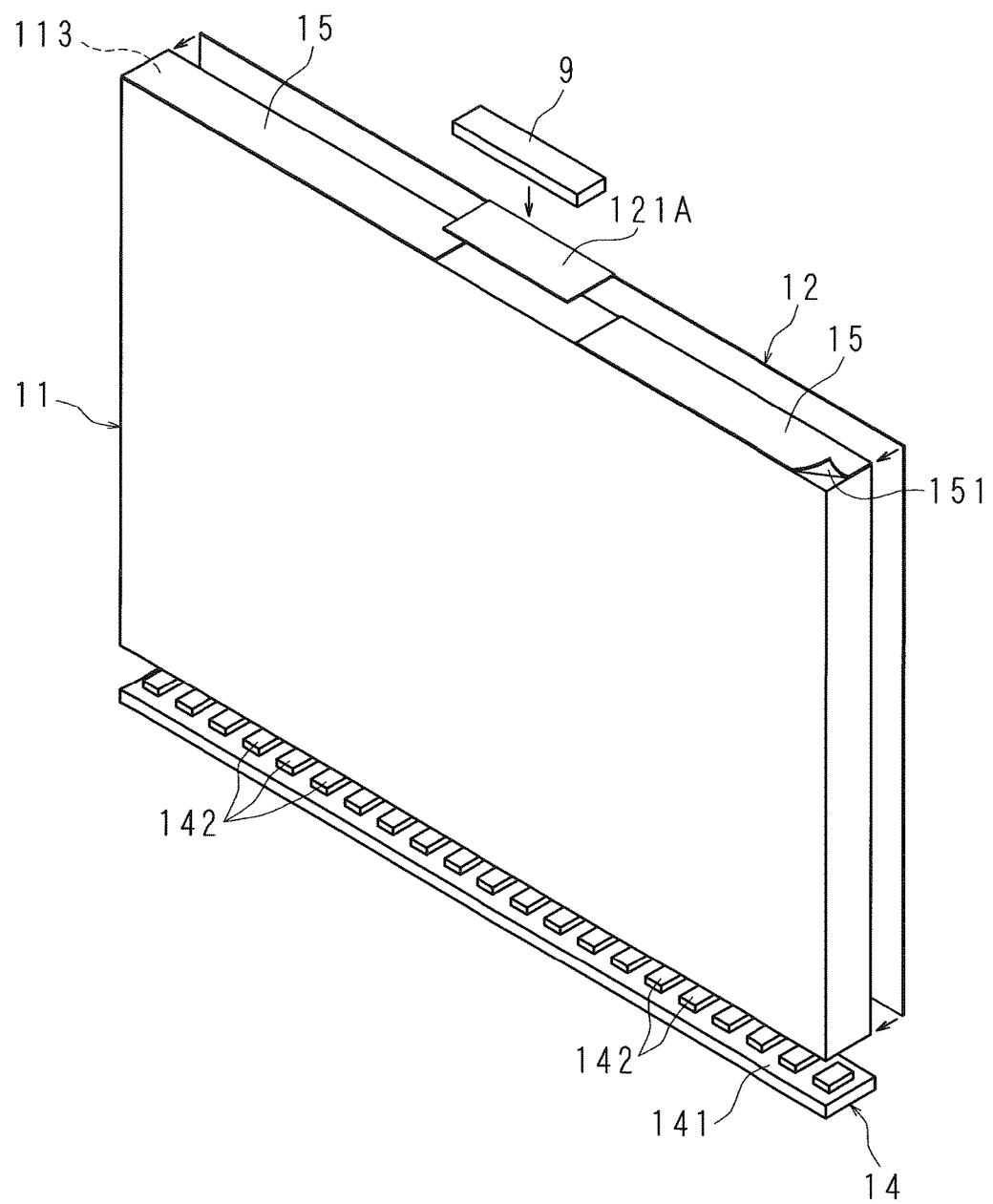
FIG. 10 is a view describing a relation between the light guide plate, the reflection sheet and the light source, in a liquid crystal television according to Embodiment 5 of the present invention.
Figure 11:
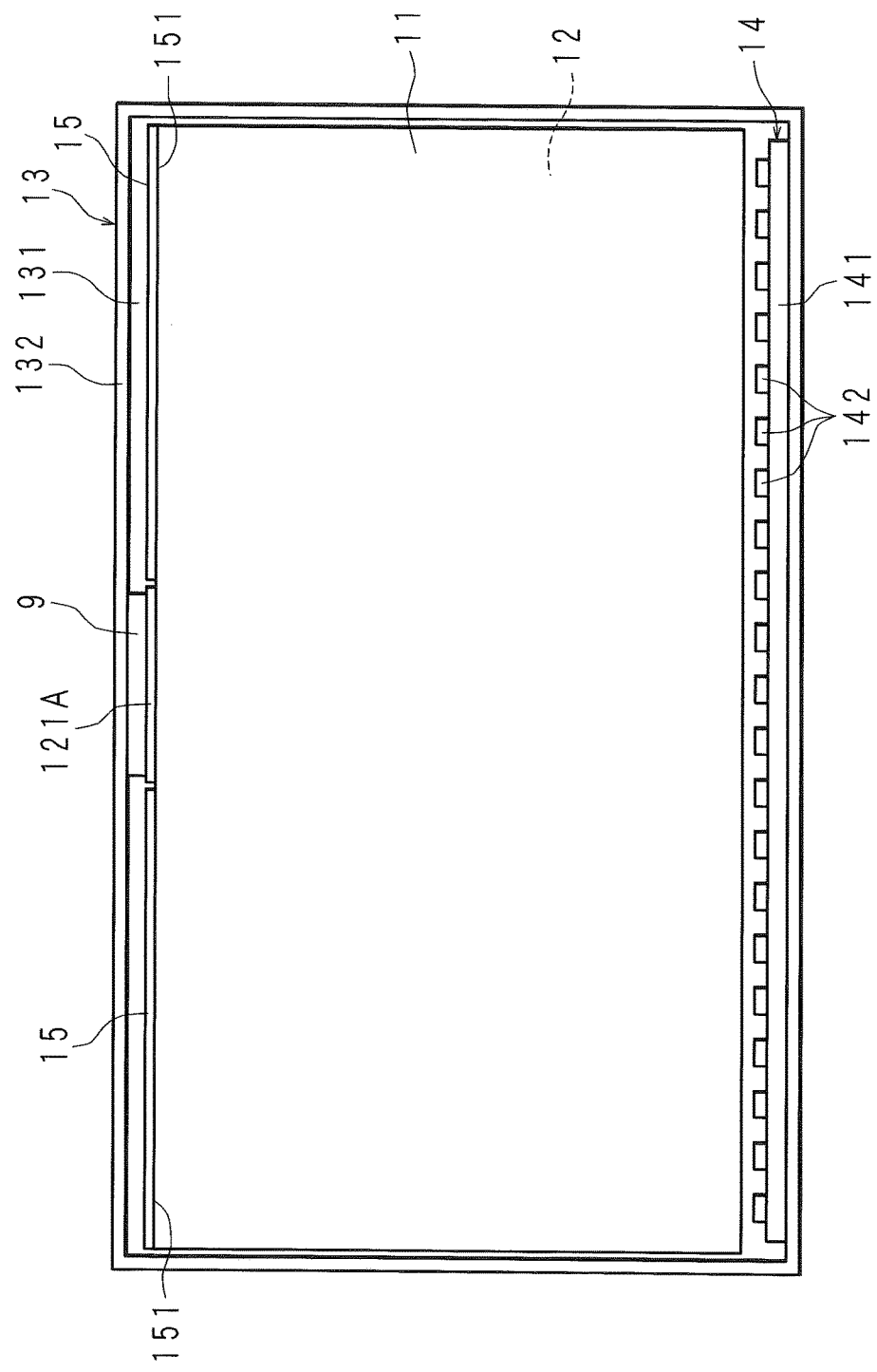
FIG. 11 is a view schematically illustrating a state in which the light guide plate and the reflection sheet are stored in the liquid crystal television according to Embodiment 5 of the present invention.

FIG. 10 is a view describing a relation between the light guide plate 11, the reflection sheet 12 and the light source unit 14, in a liquid crystal television 100 according to Embodiment 5 of the present invention, and FIG. 11 is a view schematically illustrating a state in which the light guide plate 11 and the reflection sheet 12 are stored in the liquid crystal television 100 according to Embodiment 5 of the present invention.

In Embodiment 5 of the present invention, two reflecting sheets 15 and 15 are attached to the distal side surface 113 of the light guide plate 11 at portions which are not in surface contact with the projection piece 121A. Each reflecting sheet 15 has a rectangular shape, and has a lateral dimension substantially the same as the thickness of the light guide plate 11. Therefore, the distal side surface 113 of the light guide plate 11 is covered with the reflecting sheets 15 and 15 and the projection piece 121A.

Since Embodiment 5 of the present invention has the above-described configuration, it is possible to more effectively use light which is emitted by the light source unit 14 and is made incident on the light guide plate 11, and increase a so-called in-plane luminance of the light guide plate 11.

That is, a part of the light which is emitted from the light source unit 14 and is made incident on the light guide plate 11 may escape through the distal side surface 113 of the light guide plate 11, but the light is again reflected into the light guide plate 11 by the reflection surfaces 151 and 151 of the reflecting sheets 15 and 15, such that it is possible to increase the in-plane luminance in the light emitting surface of the light guide plate 11.

The same parts as those in Embodiment 1 will be denoted by the same reference numerals, and will not be described in detail.

Embodiment 6

In the liquid crystal television 100 according to Embodiment 1 of the present invention, the case in which the projection piece 121 is provided at the one long-side edge of the reflection sheet 12, which is located near the distal side surface 113 of the light guide plate 11, has been described as an example. That is, in Embodiment 1 of the present invention, the projection piece 121 has a shape substantially the same as that of the distal side surface 113 of the light guide plate 11, and the distal side surface 113 is covered with the projection piece 121.

However, in Embodiment 6 of the present invention, a projection piece 121 is configured so as to further have a portion having a higher reflectance (hereinafter, referred to as a high-reflectance portion) than the reflection sheet 12 on a contact surface with the distal side surface 113 of the light guide plate 11.

Figure 12:
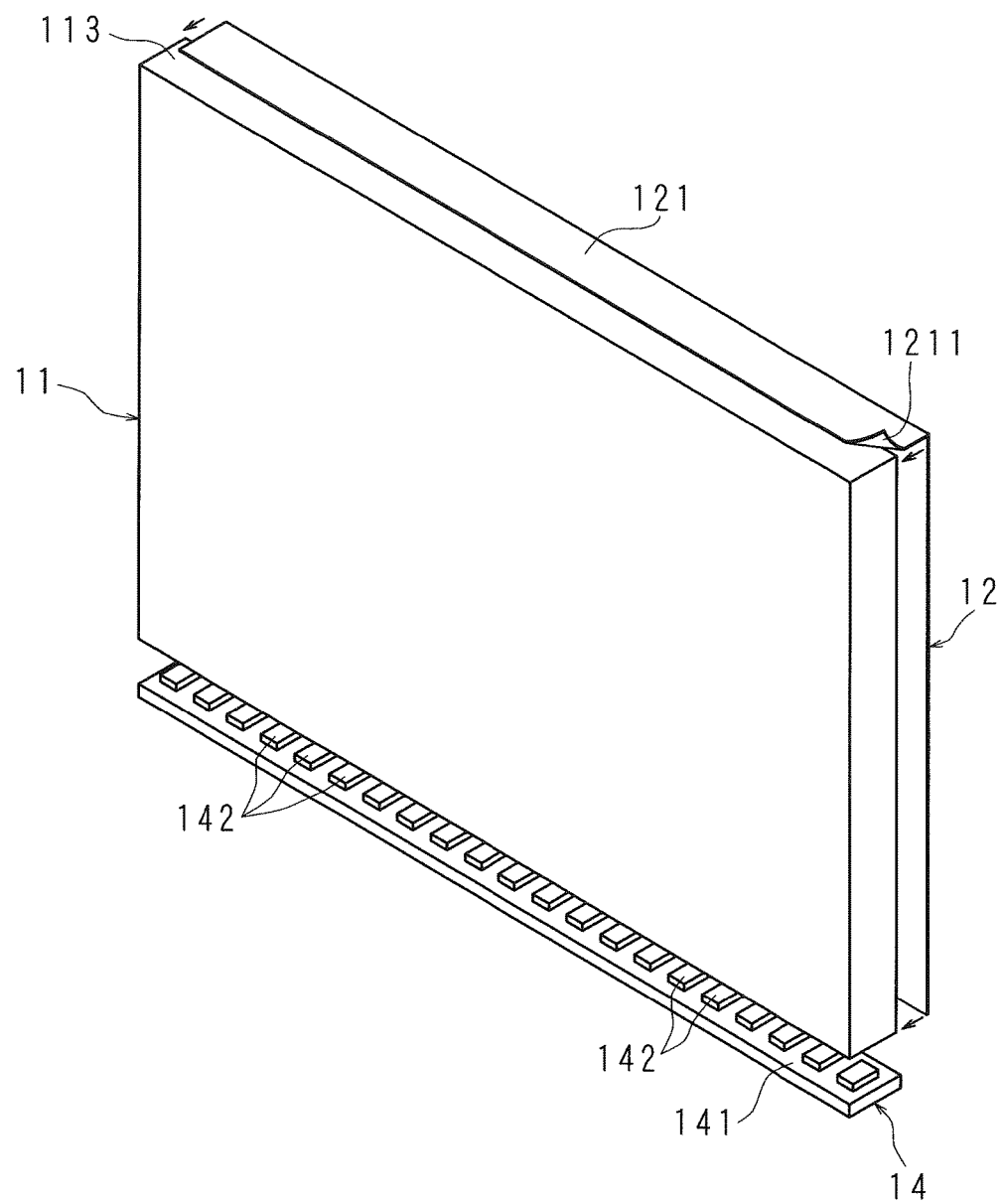
FIG. 12 is a view describing a relation between the light guide plate, the reflection sheet and the light source, in a liquid crystal television according to Embodiment 6 of the present invention.

FIG. 12 is a view describing a relation between the light guide plate 11, the reflection sheet 12 and the light source unit 14, in a liquid crystal television 100 according to Embodiment 6 of the present invention. In addition, the high-reflectance portion may be present over the entire range in a contact surface 1211 of the projection piece 121, or may be present on a part thereof.

Since Embodiment 6 of the present invention has the above-described configuration, it is possible to more effectively use light which is emitted by the light source unit 14 and is made incident on the light guide plate 11, and increase the so-called in-plane luminance of the light guide plate 11.

That is, a part of the light which is emitted from the light source unit 14 and is made incident on the light guide plate 11 may escape through the distal side surface 113 of the light guide plate 11, but the light is again reflected into the light guide plate 11 by the contact surface 1211 of the projection piece 121, such that it is possible to increase the in-plane luminance in the light emitting surface of the light guide plate 11.

The same parts as those in Embodiment 1 will be denoted by the same reference numerals, and will not be described in detail.

Embodiment 7

In the liquid crystal television 100 according to Embodiment 1 of the present invention, the case in which the projection piece 121 is provided at the one long-side edge of the reflection sheet 12, which is located near the distal side surface 113 of the light guide plate 11, has been described as an example. That is, in Embodiment 1 of the present invention, the projection piece 121 has a shape substantially the same as that of the distal side surface 113 of the light guide plate 11, and the distal side surface 113 is covered with the projection piece 121.

However, in Embodiment 7 of the present invention, a projection piece 121 is configured so as to further have a portion having a higher reflectance of a low wavelength region (hereinafter, referred to as a low-wavelength high-reflectance portion) than the reflection sheet 12 on a contact surface with the distal side surface 113 of the light guide plate 11.

Figure 13:
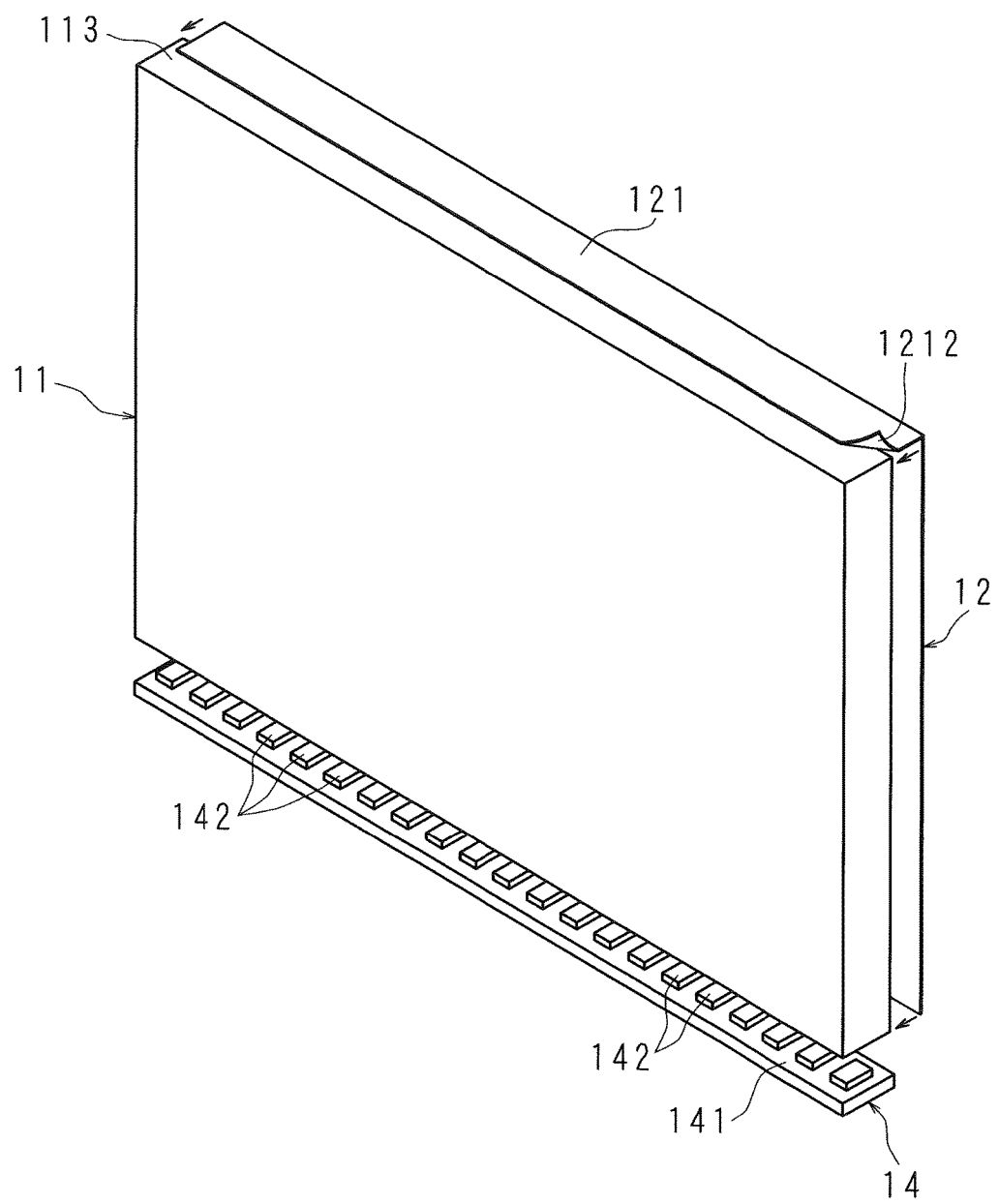
FIG. 13 is a view describing a relation between the light guide plate, the reflection sheet and the light source, in a liquid crystal television according to Embodiment 7 of the present invention.

FIG. 13 is a view describing a relation between the light guide plate 11, the reflection sheet 12 and the light source unit 14, in a liquid crystal television 100 according to Embodiment 7 of the present invention. In addition, the low-wavelength high-reflectance portion may be present over the entire range in a contact surface 1212 of the projection piece 121, or may be present on a part thereof.

Since Embodiment 7 of the present invention has the above-described configuration, it is possible to more effectively use light which is emitted by the light source unit 14 and is made incident on the light guide plate 11, and increase a so-called in-plane luminance of the light guide plate 11.

In more detail, among light which is emitted from the light source unit 14 and is made incident on the light guide plate 11, the light linearly reaching the distal side surface 113 of the light guide plate 11 strongly represents the characteristics of a blue LED, such that it contains plenty of low wavelength component. Accordingly, in the distal side surface 113, as the reflectance of a blue region (low wavelength) is increased, the light may be more effectively reflected.

In Embodiment 7 of the present invention, as described above, since the contact surface 1212 of the projection piece 121 has the low-wavelength high-reflectance portion, the light, which is emitted from the light source unit 14, is made incident on the light guide plate 11, and reaches the distal side surface 113 of the light guide plate 11, is again efficiently reflected into the light guide plate 11 by the reflection surface 1212 of the projection piece 121, such that it is possible to increase the in-plane luminance in the light emitting surface of the light guide plate 11.

The same parts as those in Embodiment 1 will be denoted by the same reference numerals, and will not be described in detail.

Embodiment 8

In the liquid crystal television 100 according to Embodiment 1 of the present invention, the case in which one clamping part 9 is provided near the one long-side edge of the reflection sheet 12 and the central part of the one long-side edge, and the clamping part 9 is in surface contact with the outside of the projection piece 121, as well as the projection piece 121 is pressed to the distal side surface 113 of the light guide plate 11, so as to hold the projection piece 121 together with the distal side surface 113 has been described as an example. However, the invention is not limited thereto.

Figure 14:
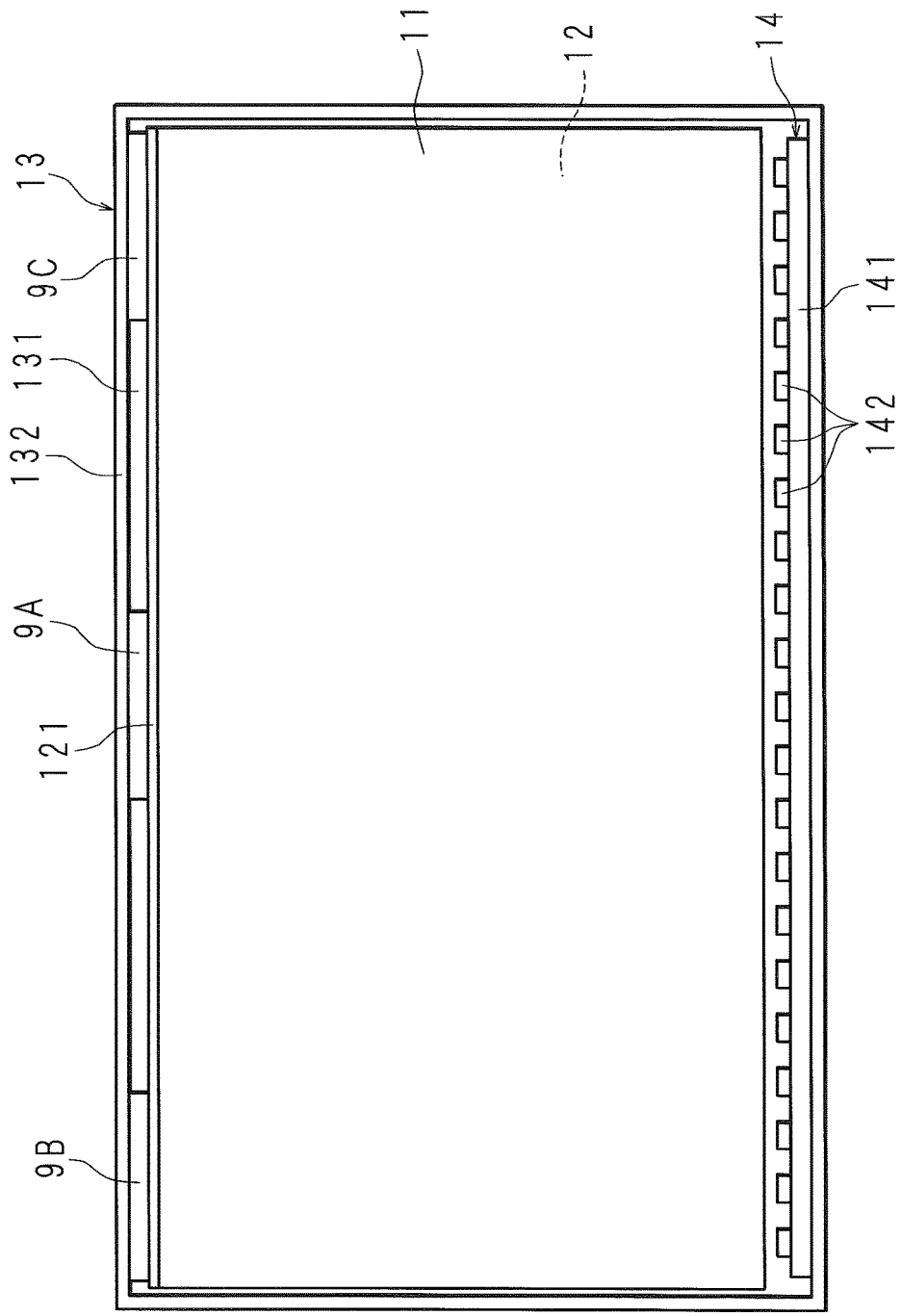
FIG. 14 is a view describing a relation between the light guide plate, the reflection sheet and the light source, in a liquid crystal television according to Embodiment 8 of the present invention.

FIG. 14 is a view describing a relation between the light guide plate 11, the reflection sheet 12 and the light source unit 14, in a liquid crystal television 100 according to Embodiment 8 of the present invention. As illustrated in FIG. 14, in Embodiment 8 of the present invention, a clamping part 9A is provided at the central part of the one long-side edge of the reflection sheet 12, and a clamping part 9B and a clamping part 9C are provided at both end parts of the one long-side edge and on both sides of the clamping part 9A, respectively.

As described above, the clamping parts 9 may be provided at a plurality of places rather than only one place. Thereby, it is possible to more reliably hold the projection piece 121 (reflection sheet 12).

In addition, the clamping part 9 may be a biasing member (for example, resin rubber, a metal spacer, a screw or the like) for biasing the projection piece 121 in a direction of pressing the same.

The same parts as those in Embodiment 1 will be denoted by the same reference numerals, and will not be described in detail.

In the above description, the case in which the light source unit 14 is provided near the side surface on the lower long-side of the light guide plate 11 has been described as an example, but the present invention is not limited thereto. For example, it may be configured such that the light source unit 14 is provided on the side of the upper long-side of the light guide plate 11, and the light source units 14 are provided at two places on both sides of lower and upper long-sides of the light guide plate 11.

Further, the present invention is not limited thereto, and it may be configured such that the light source unit 14 is provided at any one place on both sides of short-sides of the light guide plate 11 or both two places thereof.

Further, it may be configured such that the light source units 14 are provided at two places on both sides of lower and upper long-sides of the light guide plate 11 and two places on both sides of short-sides of the light guide plate 11 by adding thereto, that is, at four places on each side of the light guide plate 11.

In addition, the projection piece 121 may be configured, even if such a position of the light source unit 14 is changed, so as to correspond to the position of the light source unit 14 (clamping part 9).

It is noted that, as used herein and in the appended claims, the singular forms "a", "an", and "the" include plural referents unless the context clearly dictates otherwise.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An optical unit which includes a light guide plate configured to emit light made incident thereon through a light incident side surface from one surface thereof, and a reflection sheet disposed opposite to the light guide plate,
   wherein the reflection sheet has a projection piece on one edge thereof, which protrudes with respect to a surface of the reflection sheet,
   the projection piece is held with being in surface contact with any one side surface of the light guide plate, and
   the optical unit comprises
   a storage housing in which the light guide plate and the reflection sheet are stacked and stored and a clamping part which is provided in the storage housing to hold the projection piece between the side surface of the light guide plate.

2. The optical unit according to claim 1, wherein the projection piece is partially provided at the one edge of the reflection sheet and interposed between the side surface of the light guide plate and the clamping part.

3. The optical unit according to claim 2, wherein the light guide plate and the reflection sheet are a rectangular shape,
the one edge of the reflection sheet is an edge on the other side surface side opposing to the light incident side surface of the light guide plate, and
the projection piece is provided only at a central part of the edge.

4. The optical unit according to claim 2, wherein the light guide plate and the reflection sheet are a rectangular shape,
the one edge of the reflection sheet is an edge on a side surface side adjacent to the light incident side surface of the light guide plate, and
the projection piece is provided only at the edge on the other side surface side opposing to the light incident side surface of the light guide plate.

5. The optical unit according to claim 2, wherein the reflection sheet is a rectangular shape,
the one edge of the reflection sheet is an edge on the light incident side surface of the light guide plate, and
the projection piece and the clamping part are provided on both end sides of the one edge.

6. The optical unit according to claim 5, wherein the clamping part is integrally formed with a substrate of the light source.

7. The optical unit according to claim 2, wherein a reflecting sheet is attached to a portion which is the side surface of the light guide plate and the projection piece is not provided.

8. The optical unit according to claim 1, wherein the projection piece has a portion having a higher reflectance than the reflection sheet on a contact surface with the side surface of the light guide plate.

9. The optical unit according to claim 8, wherein the projection piece has a portion having a higher reflectance of a low wavelength region than the reflection sheet on the contact surface with the side surface of the light guide plate.

10. The optical unit according to claim 1, comprising:
a storage housing in which the light guide plate and the reflection sheet are stacked and stored, and
the reflection sheet is configured to be held by a bottom of the storage housing and the other surface of the light guide plate.

11. The optical unit according to claim 1, wherein a light source is provided at the light incident side surface side of the light guide plate.

12. The optical unit according to claim 11, wherein the light guide plate has a plurality of the light incident side surfaces.

13. The optical unit according to claim 1, wherein the clamping part is integrally formed with the storage housing.

14. The optical unit according to claim 1, wherein the projection piece is held adjacent to and movably to the clamping part.

15. The optical unit according to claim 1, wherein the clamping part is in point contact or line contact with the projection piece.

16. The optical unit according to claim 1, wherein the clamping part is a biasing member which biases the projection piece in a direction of pressing the same.

17. A display apparatus comprising:
the optical unit according to claim 1, and
a display panel which is provided on the one surface side of the light guide plate, and displays an image using light made incident thereon through the light guide plate.

* * * * *